3 Sheets—Sheet 1.
W. C. THOMPSON.
Planter and Cultivator.
No. 220,553. Patented Oct. 14, 1879.
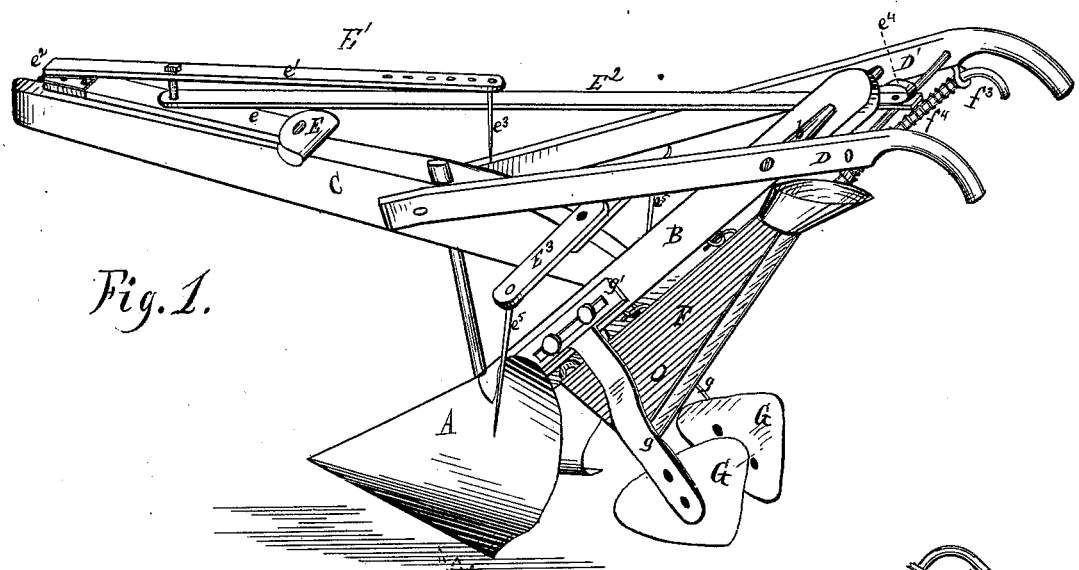
Fig. 1.
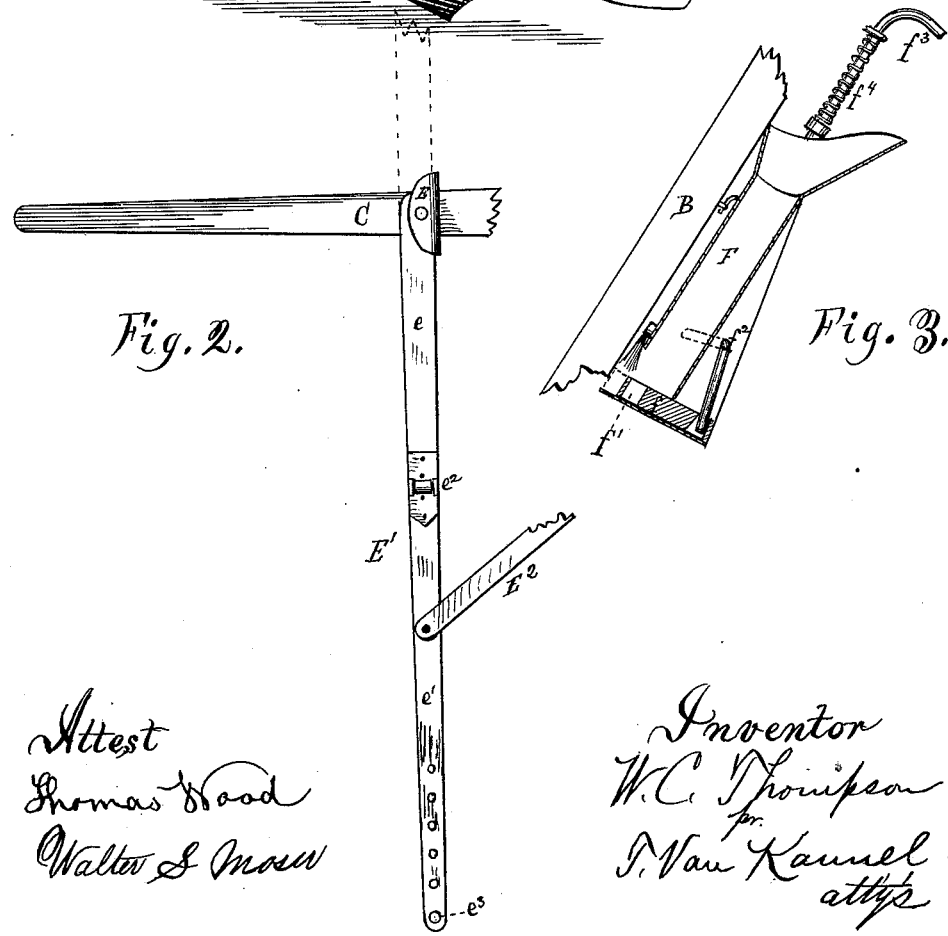
Fig. 2.
Fig. 3.
Attest
Thomas Wood
Walter S. Mosen
Inventor
W. C. Thompson
pr.
T. Van Kannel & Co
atty's
N. PETERS, PHOTO-LITHOGRAPHER, WASHINGTON, D. C.

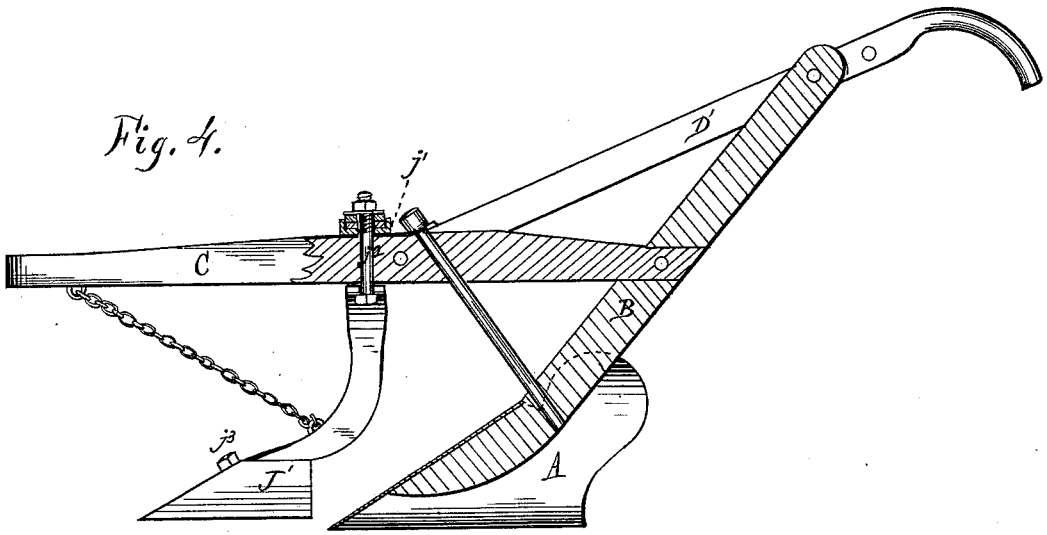
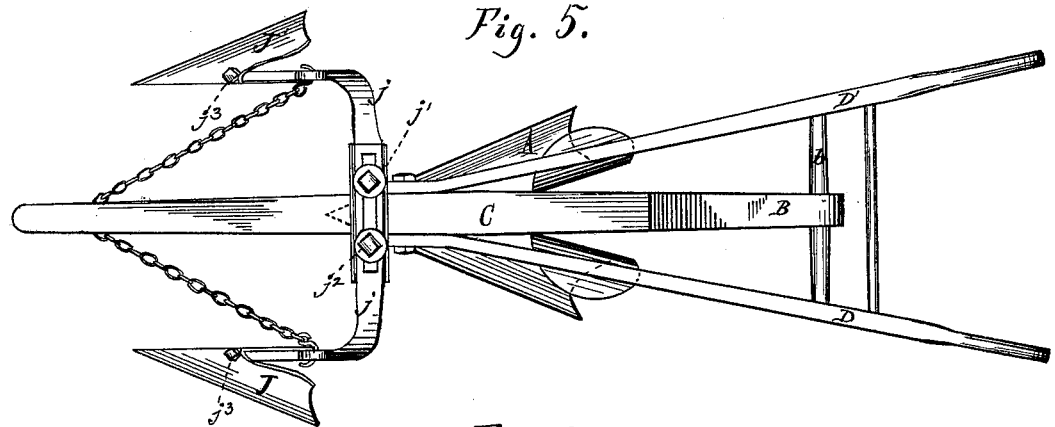
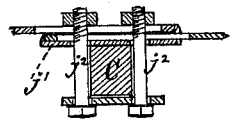

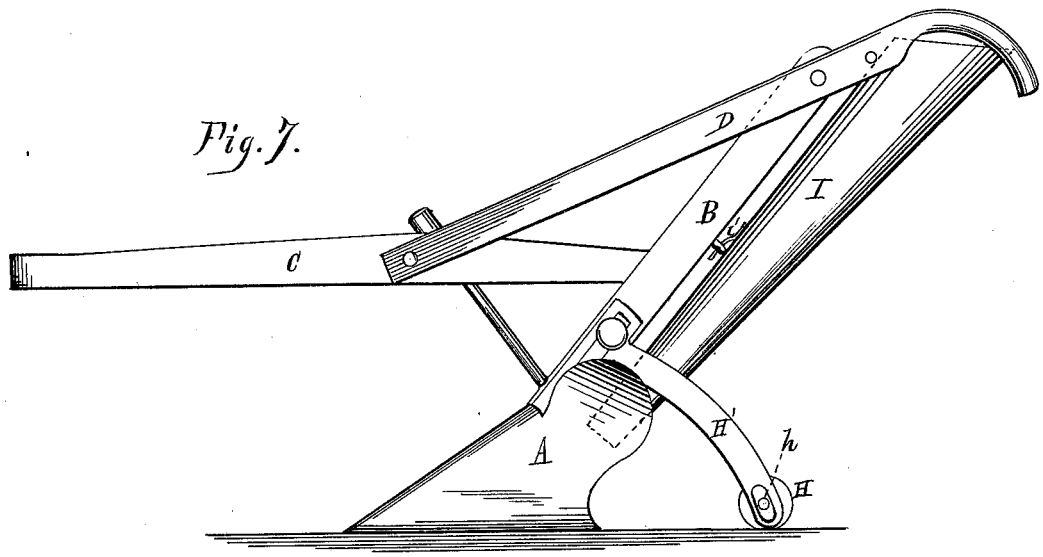
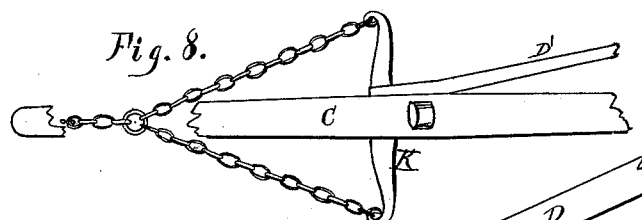
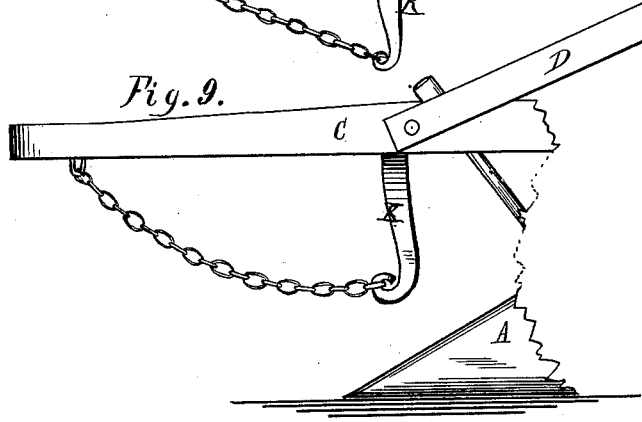
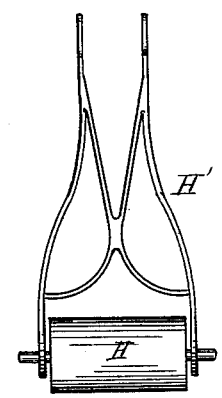

UNITED STATES PATENT OFFICE

WASHINGTON C. THOMPSON, OF COVINGTON, KENTUCKY.

IMPROVEMENT IN PLANTER AND CULTIVATOR.

Specification forming part of Letters Patent No. 220,553, dated October 14, 1879; application filed March 10, 1879.

*To all whom it may concern:*

Be it known that I, WASHINGTON C. THOMPSON, of Covington, county of Kenton, and State of Kentucky, have invented a new and useful Improved Combined Planter and Cultivator; and I do hereby declare that the following is a full, clear, and exact description of the same, reference being had to the annexed drawings, making a part of this specification.

Figure 1 in Sheet I represents my invention in perspective when used as a corn-planter; Fig. 2, a partial top view of the same, showing the reversible indicator, and that of Fig. 3 is a vertical section of the dropping mechanism. Fig. 4, Sheet II, is a longitudinal vertical section of my invention when used as a cultivator. Fig. 5 is a plan view, and Fig. 6 a cross-section, of the clamps holding the cultivator-plows. Fig. 7, Sheet III, shows my invention as a cotton-planter, being a side elevation. Figs. 8 and 9 show a device used when digging potatoes; and Fig. 10 represents a top view of the cotton-planting attachment.

In construction my machine is as follows: The double mold-board A, being constructed entirely of one piece, is bolted to the upright B, which receives the rear end of beam C. Two handles, D D', of the ordinary make are fastened to the beam and held to upright B by connecting-round $b$. At E, Fig. 1, is seen a stop-clasp, in which is pivoted the first joint $e$ of indicating-arm $E^1$, which is hinged to the terminal joint $e^1$ by a suitable stop-hinge, $e^2$. The pointer $e^3$ is inserted in any one of the holes in part $e^1$, according to the space desired between the furrows. The handle-rod $E^2$ engages by a bolt with indicating-arm $E^1$ and terminates in hook $e^4$ that rests over round $b$.

A device for sighting the cross-rows is seen in Fig. 1, consisting of two arms, $E^3$, held to the beam by means of a single bolt. At the outer end of each arm is inserted a pointer, $e^5$, which indicates to the operator more clearly when to operate the dropping device. These arms may be swung forward or backward to suit the varying gait of the plow-horse.

The planting device is more accurately shown in Fig. 3. The seed-holder F terminates at the top in a hopper, and is hung on upright B by means of two hooks of the former engaging with two corresponding staples on the latter. The bottom is nearly closed and contains the valve $f$, having a horizontal sliding motion, receiving the seed in the opening $f^1$ and dropping it when the valve $f$ is moved outward, as shown by the dotted lines. The crank-lever $f^2$ engages with valve $f$, as shown, and is operated by the finger-rod $f^3$, to which it is connected. The finger-rod passes through the loop attached to handle D', and is curved to a shape to be easily operated by the finger. The coil-spring $f^4$ tends to force the rod downward and to hold the valve within the seed-holder F. The covering device consists of two drag-hoes, G, which are connected to the upright B by the arms $g$, which end in the slotted cross-plates $g^1$ $g^1$. Two bolts pass through the slots of plates $g^2$, which hold the drag-hoes rigidly to their places and yet permit them to be adjusted vertically when so desired.

In planting cotton these drag-hoes are removed, and instead thereof the roller H and its frame H (seen in Figs. 7 and 10) are attached by the same bolts and adjusted in the same manner as the drag-hoes above described. The roller is held in position by the journals passing through slots $h$, and these give the roller a certain amount of vertical play to provide for any unevenness of the soil.

In planting potatoes, cotton-seed, (which has not been well freed of the surrounding fiber,) or any other seed that is irregular in size and shape, it is dropped by hand through the conical tube I, Fig. 7, which has two hooks, $i$, to engage in the corresponding staples. A basket or other suitable vessel is hung close by, so that the operator can feed the tube I as the planter is in motion, which seed is then covered by means of the drag-hoes G or roller H, as the case may be.

In changing this implement from a planter to a cultivator, the seed-holder F and rod $f^3$, the drag-hoes G and indicator $E^1$, and sighting device $E^3$ are all removed, and the two cultivator-plows J J' placed in position, as seen in Figs. 4 and 5, by placing the slotted arms $j j$ in the base-plate $j^1$, and bolting them, and also the plate, to the beam by means of two bolts, $j^2$. Thus by not piercing the beam its strength is preserved, and the plows may be adjusted laterally by means of the bolts where they pass through the slots in the arms $j$. To insure greater resistance, two chains attached to the beam well forward, and hooked into corresponding loops in arms $j$, make the structure both strong and light.

The plows J and J' are made detachable by means of bolts $j^3$, and are made with one side straight in the direction of their motion, while the opposite side has the ordinary mold-board.

By reversing the cultivator-plows, it will be observed the earth can be thrown to or from the center, as may be desired, thus making it available to cultivate plants that have just grown above the surface, or larger plants, as occasion may require.

The attachment shown in Figs. 8 and 9 is simply a cross-bar, K, fastened to the beam, and carrying chains which converge as they run forward when they are first joined together, and then the single strand or chain is fastened to the beam. This converging chain separates the weeds, grass, and potato-vines to prevent the plow from choking or clogging.

The operation of my invention becomes obvious from the foregoing. In planting corn, the indicator $E^1$ is folded up, as seen in Fig. 1, in making the first furrow; but in making the second furrow, and every succeeding one, the indicator $E^1$ is extended, as seen in Fig. 2, where the pointer is kept just above the furrow previously made. In making the next furrow the indicating-arm $E^1$ is swung around on the opposite side, and so on, reversing it from one side to the other at every succeeding furrow. The hinge E of arm $E^1$ permits the change being made without touching any obstruction. After the field is thus laid off one way the operator begins to plant crosswise, and uses the indicator $E^1$, as before. He also uses the sighter $E^3$, and when this comes above a cross-furrow, with a finger of his right hand he draws up the finger-rod $f^3$, which discharges a given number of grains of seed, and as the plow progresses the drag-hoes cover the same. By this way a very correct check-row planting is secured.

The operation of the cotton-planter and potato planter and digger has already been sufficiently described to make it easily understood.

Having thus described my invention, what I claim as new, and desire to secure by Letters Patent, is—

1. The combination, with the plow-frame, of the detachable marking-bar, pivoted to swing horizontally upon the plow-beam, and jointed to fold upon such plow-beam, and having marking-point $c^3$, adapted to be adjusted at different distances from the plow-beam by passing it through any one of a number of holes in the marking-bar, substantially as described and shown.

2. The combination, with the plow-frame, of the socket-plate E, the jointed and pivoted marking-bar $E^1$, and the rod $E^2$, having hook $e^4$, substantially as described and shown.

3. The combination, with the plow-frame having double mold-board, of the removable seed-holder and operating-rod, the removable covering hoes or roller, the removable jointed and pivoted marking-bar, and the pivoted sight-arms, substantially as described and shown.

W. C. THOMPSON.

Attest:
HENRY MEYER,
A. V. STEWART.